Feb. 22, 1938.     Y. SPIEGEL     2,109,361
SAFETY DEVICE FOR HOMES
Filed May 6, 1937
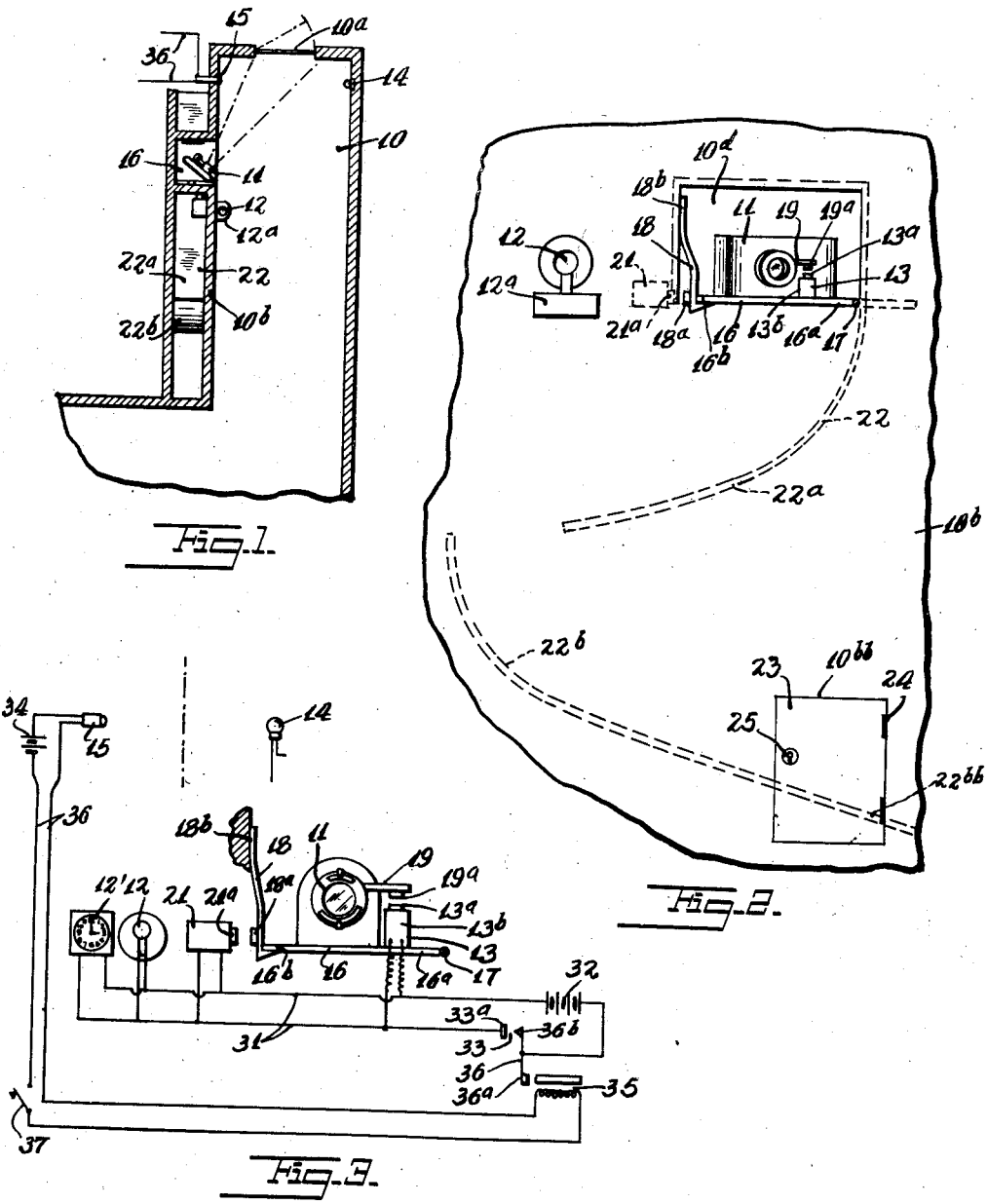
INVENTOR
YETTA SPIEGEL
BY
ATTORNEY Patented Feb. 22, 1938

2,109,361

UNITED STATES PATENT OFFICE 2,109,361

SAFETY DEVICE FOR HOMES

Yetta Spiegel, New York, N. Y.

Application May 6, 1937, Serial No. 141,125

4 Claims. (Cl. 95—11)

This invention relates to new and useful improvements in a safety device for homes.

More specifically, the invention proposes the construction of a safety device which is adapted to be used in conjunction with an entrance to a home, or building, which is operated by the interruption of a beam passing from a light to a photoelectric cell.

Still further the invention proposes the use of a camera for taking the picture of an unauthorized person who passes between the light and the photo-electric cell.

Still further the invention provides for the use of a photo-electric cell, or an ultraviolet ray device, for operating the shutter of said camera.

As a further object of the invention it is proposed to mount the camera upon a drop shelf having an electric holding device for fixedly holding the shelf in a horizontal position and operative when said beam is broken to drop said camera.

As a further object of the invention it is proposed to provide a chute system below said drop shelf for conveying the camera from the drop shelf to a point of safety to prevent the intruder from destroying the picture which has been taken.

Still further the invention provides for the use of a photoflash bulb or similar device for illuminating the dark hallway to permit the camera to adequately take the picture of the intruder.

Still further the invention provides for a detector for controlling the operation of the camera, the drop shelf and the photoflash bulb.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a sectional plan view of a hallway provided with a safety device according to this invention.

Fig. 2 is an enlarged elevational view of a portion of Fig. 1.

Fig. 3 is a schematic wiring diagram of the device.

The safety device for homes according to this invention, is intended to be used in conjunction with hallways or other passages 10. A camera 11 is trained on the entrance 10ª to the passage 10 which has an electrically operated flashlight bulb 12 for illuminating said passage to permit the camera to take a picture. An electric operator 13 is provided for operating the shutter of the camera 11 and a circuit is provided for controlling the operation of the flashlight 12 and the camera operator 13. A detector is provided for controlling said circuit operative automatically upon the presence of an unauthorized person in the passage.

The hallway or other passage 10 is provided with an opening or entrance at one end adapted to be closed by the door 10ª. The hall 10 has side walls 10ᵇ and 10ᶜ. The wall 10ᵇ is provided with a wall alcove or an opening 10ᵈ in which the camera 11 is mounted upon a shelf or door 16. An electric light bulb 14 is mounted on the wall 10ᶜ inside of the door 10ª, and a cooperative photo-electric cell 15 is mounted on the opposite wall 10ᵇ and is adapted to operate a circuit for controlling a second circuit which operates the camera 11 and the flashlight 12.

The camera 11 is placed on the drop door 16 which is hingedly mounted at one of its ends 16ª by means of a hinge 17, and has the other of its ends 16ᵇ engaging a hook 18 for holding it in a horizontal position to support said camera within the opening 10ᵈ with its shutter directed toward the entrance to the passage. The operator 19 for the shutter of the camera 11 is provided with an iron piece 19ª which is adapted to be drawn toward the core 13ª of an electro-magnet 13ᵇ which causes the operator 13 to operate the shutter when the electro-magnet has been energized. When this electro-magnet has been energized it will draw the contact 19 toward the contact 13ª to pivot the operator 19 causing the shutter to operate.

The electrically operated flash 12 is supported on the wall 10ᵇ by a platform 12ª and is connected in the same circuit with the electro-magnet 13ᵇ and is adapted to illuminate simultaneously with the energizing of the electro-magnet 13ᵇ to illuminate the hallway to permit the camera to adequately take a picture. A means is provided in the circuit to drop the camera 11 and convey it to a point of safety simultaneous with the operation of the electro-magnet 13ᵇ and the flash light 12. More specifically, this means includes an electro-magnet 21 having a core 21ª which is adapted to draw an iron piece 18ª on the hook 18 towards itself to disengage the hook 18 from the end 16ª of the shelf 16 to permit it to swing downward and drop the camera upon the chute system 22. The other end 18ᵇ of the hook 18 is mounted on one of the walls of the opening 10ᵇ and the hook is constructed of resilient material.

When the door 16 drops, the camera will fall upon a member 22ª and slide down this member and drop off the end on to a second member 22ᵇ directed in the opposite direction from the member 22ᵃ to convey the camera beneath the member 22ᵃ to prevent the intruder from reaching the camera after the picture has been taken. The end 22ᵇᵇ of the member 22ᵇ is adjacent an opening 10ᵇᵇ in the wall 10ᵇ which is provided with a door 23 which is hingedly mounted at one of its sides upon hinges 24. The other of its sides is provided with a lock 25 for normally holding the door closed and which may be opened by an authorized person to permit the camera to be taken off the chute system 22. The intruder whose picture has been taken cannot get the camera because the door 23 is normally locked and the member 22ᵃ prevents him from putting his arm through the opening 10ᵈ and retrieving the camera after it has been dropped by the shelf 16.

Referring to Fig. 3 which is a schematic wiring diagram, it will be noted that a time recording device 12', the electro-magnet 13ᵇ, the electro-magnet 21 and the flashlight 12 are connected in parallel in a circuit 31, which is provided with a source of power 32 and a switch 33 of a relay 35 for closing the circuit 31 and simultaneously energizing the electro-magnet 13ᵇ to operate the camera, and energize the electro-magnet 21 to release the shelf 16, drop the camera, and to provide power to illuminate the flashlight 12 to assist the camera in getting the picture of the intruder and simultaneously to record the time.

The detector controlling the circuit 31 includes the photo-electric cell 15, a source of power 34, and a relay 35 connected in series in a circuit 36 which is adapted to be disturbed when the intruder passes between the light 14 and a photo-electric cell 15 to energize the relay 35 to pivot the arm 36 of the relay 35. This arm 36 is provided at one of its ends with an iron piece 36ᵃ which is adapted to be drawn toward the core of the relay 35 to swing its other end provided with the contact 36ᵇ to engage the contact 33ᵃ of the switch 33 to complete the circuit 31.

A switch 37 is connected in the circuit 36 and is concealed from view in any appropriate position and which is normally in a closed position to permit the photo-electric cell to operate as described above. When an authorized person enters the door 10ᵃ he will know where the switch 37 has been concealed and will open the switch before passing the photo-electric cell, to open the circuit 36 preventing the camera from taking a picture.

It is to be understood that this device may be used at any door, window or other place, also that the photo-electric cell arrangement may be used to operate one or more cameras positioned at different places or located adjacent to each other and set at different angles so as to obtain the various exposures of the intruder.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In combination with a passage for persons, a drop shelf for supporting a camera adapted to be trained upon said passage, an electric holding device for fixedly holding said shelf, and a chute system for conveying said camera to a place of safety upon dropping of said shelf, an electric operator for said camera and a circuit for controlling the said holding device and said electric operator, and a detector for controlling said circuit.

2. In combination with a passage for persons, a drop shelf for supporting a camera adapted to be trained upon said passage, an electric holding device for fixedly holding said shelf, and a chute system for conveying said camera to a place of safety upon dropping of said shelf, an electric operator for said camera and a circuit for controlling the said holding device and said electric operator, and a detector for controlling said circuit, said circuit for controlling said holding device comprising a source of power, a switch, an electro-magnet, a hook engaging one end of said drop shelf for supporting said shelf in a horizontal position, and contacts on the adjacent faces of said electro-magnet and said hook for pivoting said hook when said electro-magnet has been energized to disengage it from the end of said shelf to permit said shelf to pivot and drop said camera.

3. In combination with a passage for persons, a drop shelf for supporting a camera adapted to be trained upon said passage, an electric holding device for fixedly holding said shelf, and a chute system for conveying said camera to a place of safety upon dropping of said shelf, an electric operator for said camera and a circuit for controlling the said holding device and said electric operator, and a detector for controlling said circuit, said chute system comprising a member mounted below said drop shelf and upon which said camera is adapted to fall, and a second member mounted below said member and directed in the opposite direction from said member and upon which said camera is adapted to fall after sliding the length of said member to be conveyed to a point of safety at the end of said second member.

4. In combination with a passage for persons, a drop shelf for supporting a camera adapted to be trained upon said passage, an electric holding device for fixedly holding said shelf, and a chute system for conveying said camera to a place of safety upon dropping of said shelf, an electric operator for said camera and a circuit for controlling the said holding device and said electric operator, and a detector for controlling said circuit, said chute system comprising a member mounted below said drop shelf and upon which said camera is adapted to fall, and a second member mounted below said member and directed in the opposite direction from said member and upon which said camera is adapted to fall after sliding the length of said member to be conveyed to a point of safety at the end of said second member, a pivotally mounted door at the lower end of said second member held in a normally closed position by a lock and which may be opened by an authorized person to permit said person to retrieve said camera.

YETTA SPIEGEL.